(12) United States Patent
Diguet et al.

(10) Patent No.: US 12,117,626 B2
(45) Date of Patent: Oct. 15, 2024

(54) COMPOSITE LAMINATE FOR TRANSPARENT ELEMENTS WITH DIFFUSE REFLECTION

(71) Applicant: SAINT-GOBAIN GLASS FRANCE, Courbevoie (FR)

(72) Inventors: Antoine Diguet, Paris (FR); Daniele Costantini, Paris (FR); Jean-Baptiste Laudereau, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 374 days.

(21) Appl. No.: 17/613,343

(22) PCT Filed: May 14, 2020

(86) PCT No.: PCT/EP2020/063528
§ 371 (c)(1),
(2) Date: Nov. 22, 2021

(87) PCT Pub. No.: WO2020/234127
PCT Pub. Date: Nov. 26, 2020

(65) Prior Publication Data
US 2022/0221626 A1    Jul. 14, 2022

(30) Foreign Application Priority Data

May 23, 2019   (FR) ..................... 1905423

(51) Int. Cl.
*G02B 5/02*    (2006.01)
*B32B 7/023*   (2019.01)
(Continued)

(52) U.S. Cl.
CPC ............ *G02B 5/0294* (2013.01); *B32B 7/023* (2019.01); *B32B 27/08* (2013.01); *B32B 27/306* (2013.01);
(Continued)

(58) Field of Classification Search
None
See application file for complete search history.

(56) References Cited

U.S. PATENT DOCUMENTS

| 6,365,284 B1 | 4/2002 | Liposcak |
| 2004/0076819 A1* | 4/2004 | Pitt ................. C23C 14/083 428/328 |

(Continued)

FOREIGN PATENT DOCUMENTS

| JP | 2012-003027 A | 1/2012 |
| JP | 2016-009271 A | 1/2016 |

(Continued)

OTHER PUBLICATIONS

RefractiveIndex.INFO database entry for vanadium dioxide (Year: 2024).*

(Continued)

*Primary Examiner* — Ramsey Zacharia
(74) *Attorney, Agent, or Firm* — Pillsbury Winthrop Shaw Pittman LLP (57) ABSTRACT

A composite laminate makes it possible to obtain transparent layered elements with diffuse reflection that can be used in esthetic and/or antireflection glazings, or even in transparent projection screens. The composite laminate includes an organic polymeric support, a layer and a first transparent organic polymeric substrate. The dielectric layer is disposed between the support and the substrate. The dielectric layer has a refractive index greater than the refractive index of the first substrate. The adhesive energy between the dielectric layer and the support is less than the adhesive energy between the dielectric layer and the substrate.

13 Claims, 3 Drawing Sheets

(51) Int. Cl.
    *B32B 27/08* (2006.01)
    *B32B 27/30* (2006.01)
    *B32B 37/24* (2006.01)

(52) U.S. Cl.
    CPC ............ *B32B 37/24* (2013.01); *G02B 5/0284* (2013.01); *B32B 2037/243* (2013.01); *B32B 2250/02* (2013.01); *B32B 2255/10* (2013.01); *B32B 2255/20* (2013.01); *B32B 2307/204* (2013.01); *B32B 2307/412* (2013.01); *B32B 2307/418* (2013.01); *B32B 2551/00* (2013.01)

(56) References Cited

U.S. PATENT DOCUMENTS

| | | | |
|---|---|---|---|
| 2006/0046083 A1 | 3/2006 | Steinhardt et al. | |
| 2013/0258479 A1* | 10/2013 | Okafuji | C09D 5/006 |
| | | | 156/247 |
| 2017/0203536 A1* | 7/2017 | Nakayama | B32B 7/02 |

FOREIGN PATENT DOCUMENTS

| | | |
|---|---|---|
| WO | WO 03/074270 A2 | 9/2003 |
| WO | WO 2012/104547 A1 | 8/2012 |
| WO | WO 2014/135892 A1 | 9/2014 |
| WO | WO 2018/142050 A1 | 8/2018 |

OTHER PUBLICATIONS

RefractiveIndex.INFO database entry for ethylene vinyl acetate (Year: 2024).*
International Search Report as issued in International Patent Application No. PCT/EP2020/063528, dated Jul. 9, 2020.

* cited by examiner

COMPOSITE LAMINATE FOR TRANSPARENT ELEMENTS WITH DIFFUSE REFLECTION

CROSS-REFERENCE TO RELATED APPLICATIONS

This application is the U.S. National Stage of PCT/EP2020/063528, filed May 14, 2020, which in turn claims priority to French patent application number 1905423 filed May 23, 2019. The content of these applications are incorporated herein by reference in their entireties.

FIELD

The invention relates to a composite laminate that makes it possible to obtain transparent layered elements with diffuse reflection that can be used in esthetic and/or antireflection glazings, or even in transparent projection screens.

BACKGROUND

Examples of application of diffuse reflection are façade glazings of buildings, urban developments or vehicles in which it is used to provide them with certain esthetic or antireflection effects. In façade glazings, the diffuse reflection makes it possible notably to reduce the risk of glare provoked by the reflection of light from the headlights of vehicles on the façades. The safety and comfort of the driver are then enhanced.

Another example of application of diffuse reflection are the glazings used in transparent projection screens. These transparent projection screens make it possible to superimpose a display of information in the field of vision of an operator over an environment that he or she is observing through these screens. They generally take the form of a glazing with diffuse reflection. In the vehicles, they are notably known in the form of head-up collimators (HUD or Head-Up Display) which allow the driver to view information such as, for example, the speed of the vehicle or the directions of an itinerary to be followed, directly on a windshield, without having to divert the eyes. It can also be used, in public or private spaces, for the purposes of displaying information with esthetic transparency effects.

One technology on which these glazings are based consists generally of certain elements comprising a rough or textured interface disposed between two transparent substrates of substantially similar refractive index. A reflecting layer or a layer of higher refractive index than those of the two transparent substrates can possibly disposed at the interface. The diffuse reflection is provoked by the combination of texture and the change of refractive index at the interface between the two transparent substrates.

A projection screen comprising such glazing operates as follows. When a light image is projected onto the surface of the screen, a part of the light is transmitted through the screen while another is reflected by the rough or textured interface. The reflected light forms the image which is superimposed on the environment observed in the field of view of the observer. To obtain such an effect, it is necessary for the glazing to have a high level of transparency in order for an observer to be able to see through, and a level of diffuse reflection sufficient to allow the projected image to be displayed. Generally, for these glazings, a level of clarity or of transparency of at least 95%, and a level of fuzziness less than 20%, even 10%, are generally sought.

The patent application WO 2012104547 A1 describes a transparent layered element with diffuse reflection comprising two transparent substrates, organic or inorganic, of substantially similar refractive indices between which there is disposed a dielectric layer of refractive index higher than those of said substrates. Each surface between two adjacent layers is textured and parallel to them.

The patent application WO 03074270 A2 also describes a transparent layered element with diffuse reflection. It is fairly similar to the preceding one. However, the dielectric layer is replaced by a metallic layer and is disposed between the two substrates.

Other examples of transparent layered elements with diffuse reflection are described in the applications WO 2014135892 A1, JP2016009271 and JP2012003027A.

These layered elements of the state of the art exhibit some drawbacks.

First of all, the texturing of the surfaces requires specific surface treatment operations which have to be performed upstream of the assembly methods. For example, in the case of a substrate made of mineral glass, these operations are generally operations involving chemical attack or rolling process-based hot embossing. In the case of organic substrates, these operations are generally hot or cold embossing operations. These additional operations can complicate the existing assembly methods and increase production costs.

Some substrates are unsuitable for the deposition of dielectric layers on their surfaces either because of chemical incompatibility between the materials of the substrates and the materials of the dielectric layers, or because of incompatibility with the dielectric layer deposition methods, or even for both these reasons combined. On the other hand, however, although suited to the deposition of dielectric layers, they are not so suited to the application sought for the transparent layered element with diffuse reflection. It is also possible to combine a first substrate suited to deposition with a second substrate unsuited to deposition in order to provide the second substrate with a function. In this case, it may be that the first substrate creates problems of mechanical withstand strength and/or of chemical durability.

For example, in the case of laminated glazings, the substrates based on PET and on PMMA are suitable for the deposition of a dielectric layer by cathodic sputtering. However, their mechanical and chemical properties often render them unsuited to the rolling of a laminated glazing. They can react with the other organic layers used or even have a thermomechanical behavior that is inappropriate for the rolling method. For example, defects in the form of wrinkles can appear when shaping the glazing. As for the materials that are based on PVB, regularly used in laminated glazings, only some of them are compatible with the dielectric layer deposition compositions and methods.

The number of combinations between compositions of substrates and compositions of dielectric layers is therefore limited for obtaining transparent layered elements with diffuse reflection according to the application sought.

There are also methods for transferring dielectric layers between substrates. One example is that described in the U.S. Pat. No. 6,365,284 B1. This is a method that makes it possible to transfer a dielectric layer from a PET substrate to a smooth, non-textured surface of a PVB substrate, in order to form a transparent layered element totally without geometrical defects of wrinkle or orange-peeling type at the interfaces. This method does not make it possible to form a transparent layered element comprising an interface with diffuse reflection properties.

SUMMARY

There is therefore a need for a flexible solution to benefit from the technical advantages of any substrate suited to the deposition of dielectric layers whatever the application sought for the transparent layered element with diffuse reflection likely to be obtained. Such a solution would also make it possible to avoid having to design manufacturing methods dedicated to certain transparent layered elements with diffuse reflection, or even avoid a significant modification of the existing methods when a change of transparent substrate or of dielectric layer is sought in said layered elements.

The present invention makes it possible to satisfy this need. Its subject is a composite laminate that can be used to obtain transparent elements with diffuse reflection. It relates also to a method for manufacturing such a composite laminate and to a method for manufacturing a lamination interlayer for glazing implementing such a composite laminate.

In an aspect of the invention, there is provided a composite laminate comprising:
  an organic polymeric support comprising an edge, a first main face and a second main face;
  a dielectric layer comprising a first main face and a second main face;
  a first transparent organic polymeric substrate comprising an edge, a first main face and a second main face;
  wherein:
  the first main face of the dielectric layer is in contact with the second main face of the first transparent polymeric organic substrate;
  the second main face of the dielectric layer is in contact with the first main face of the organic polymeric support;
  the dielectric layer has a refractive index greater than the refractive index of the first transparent organic polymeric substrate;
  an adhesive energy between the second main face of the dielectric layer and the first main face of the organic polymeric support is less than an adhesive energy between the first main face of the dielectric layer and the second main face of the first transparent organic polymeric substrate.

In another aspect of the invention, there is provided a method for manufacturing a composite laminate comprising:
  (a) depositing a dielectric layer on a first main face of an organic polymeric support;
  (b) bringing the dielectric layer into contact with a second main face of a first transparent organic polymeric substrate;
  (c) laminating the assembly formed by the organic polymeric support, the dielectric layer and the first transparent organic polymeric substrate;
  and in which method:
  the first main face of the dielectric layer is in contact with the second main face of the first transparent polymeric organic substrate;
  a second main face of the dielectric layer is in contact with a first main face of the organic polymeric support;
  said dielectric layer has a refractive index greater than the refractive index of said first transparent organic polymeric substrate;
  an adhesive energy between the second main face of the dielectric layer and the first main face of the organic polymeric support is less than an adhesive energy between the first main face of the dielectric layer and the second main face of the transparent organic polymer substrate.

In yet another embodiment of the invention, there is provided a method for manufacturing a transparent layered element with diffuse reflection, said method comprising:
  (a) supplying a composite laminate described before;
  (b) delaminating said composite laminate so as to provoke removal of the organic polymeric support;
  (c) supplying a second transparent organic polymeric substrate comprising an edge, a first main face and a second main face;
  (d) bringing the first main face of the second transparent organic polymeric substrate into contact with the second main face of the first transparent polymeric substrate so as to insert the dielectric layer between said first main face of the second transparent organic polymeric substrate and the second main face of the first transparent polymeric substrate.

BRIEF DESCRIPTION OF THE DRAWINGS

In order to make the present invention easier to understand, it is now described and illustrated with reference to the elements of the drawings in their different views.

DETAILED DESCRIPTION

In the context of the invention, the following definitions are used. It is considered that a dielectric layer is a layer whose electrical conductivity is low, typically less than 100 S/m.

It is understood that two layers have different refractive indices if the absolute value of the difference in their refractive index at 550 nm is greater than 0.15.

When it is applied to a layer, a substrate or a glazing, the term "transparent" is used to qualify a layer, a substrate or a glazing through which or from which at least a part of the electromagnetic radiation is transmitted in a useful range of wavelengths for the application sought, such that an object can be distinctly discerned through said element in said useful range of wavelengths.

For a given range of wavelengths of an electromagnetic radiation, a level of transparency or of clarity of a layer, of a substrate or of a glazing can be defined in the form of a ratio of intensities calculated according to the following steps:
  (a) calculation of the difference between
    the intensity of the radiation transmitted through said layer in a given direction in a first solid angle defined by a first cone of revolution whose axis of revolution is said direction and whose half-angle at the vertex is less than 0.7°, the vertex of said first cone being placed on the surface of said layer by which the electromagnetic radiation is transmitted, and
    the intensity of the radiation transmitted in a second solid angle defined by a second cone of revolution whose axis of revolution is said direction and whose half-angle at the vertex is between 0.7° and 2°, the vertex of said second cone coinciding with the vertex of the first cone, (b) calculation of the ratio of the difference obtained in step (a) to the total intensity of the electromagnetic radiation transmitted in all of the solid angle defined by the cone of revolution whose axis of revolution is said direction and whose half-angle at the vertex is between 0° and 2°.

A layer is generally qualified as transparent when this ratio is at least equal to 0.8, even 0.9.

A textured face or textured surface is understood to mean a face or a surface in which the geometric dimensions of its relief are greater than the wavelengths of the useful range of wavelengths of the incident radiation on said surface. Generally, and without being limiting, a typical example of textured surface is a so-called rough surface in which the arithmetic mean of the absolute values of the heights and depths of its relief profile relative to the median plane of said relief is between 1 μm and 1 mm. Alternatively, the texture of a surface can also be defined as a surface roughness characterized by a parameter Rz measured according to the standard ISO 4287:1997 and whose value is between 1 μm and 1 mm.

Adhesive energy between two faces or two surfaces is considered to be the energy needed to separate said faces or surfaces when they adhere together by contact because of any physico-chemical adhesion phenomenon. The adhesion, or adhesive force, corresponds to the force needed to produce this separation.

Level of "fuzziness" or of "haze" is understood to mean the proportion of the electromagnetic radiation transmitted through a material and whose dispersion angle is greater than 2.5° relative to the direction of incidence of said radiation. This definition corresponds to those of the standards ISO 14782 and ASTM D1003.

The expression "based on", used to qualify a material or a layer with respect to what it contains, means that the fraction by weight of the component that it comprises is at least 50%, in particular at least 70%, preferably at least 90%.

"Light" as both noun and qualifier is understood to mean the electromagnetic radiation of the range of the electromagnetic spectrum corresponding to the range of visible light, that is to say with a wavelength of between 380 nm and 800 nm.

Light transmission and light reflection are defined, measured and calculated in accordance with the standards EN 410 and ISO 9050. Color is measured in the 1976 IEC L*a*b* chromatic space according to standard ISO 11664 with a D65 illuminant and a visual field of 2° for the reference observer.

Proportion of "diffuse light" is considered to mean the proportion of light reflected by the surface of a material, the angle of dispersion of which is greater than 2.5° relative to the direction of the incident light.

Figure 1:
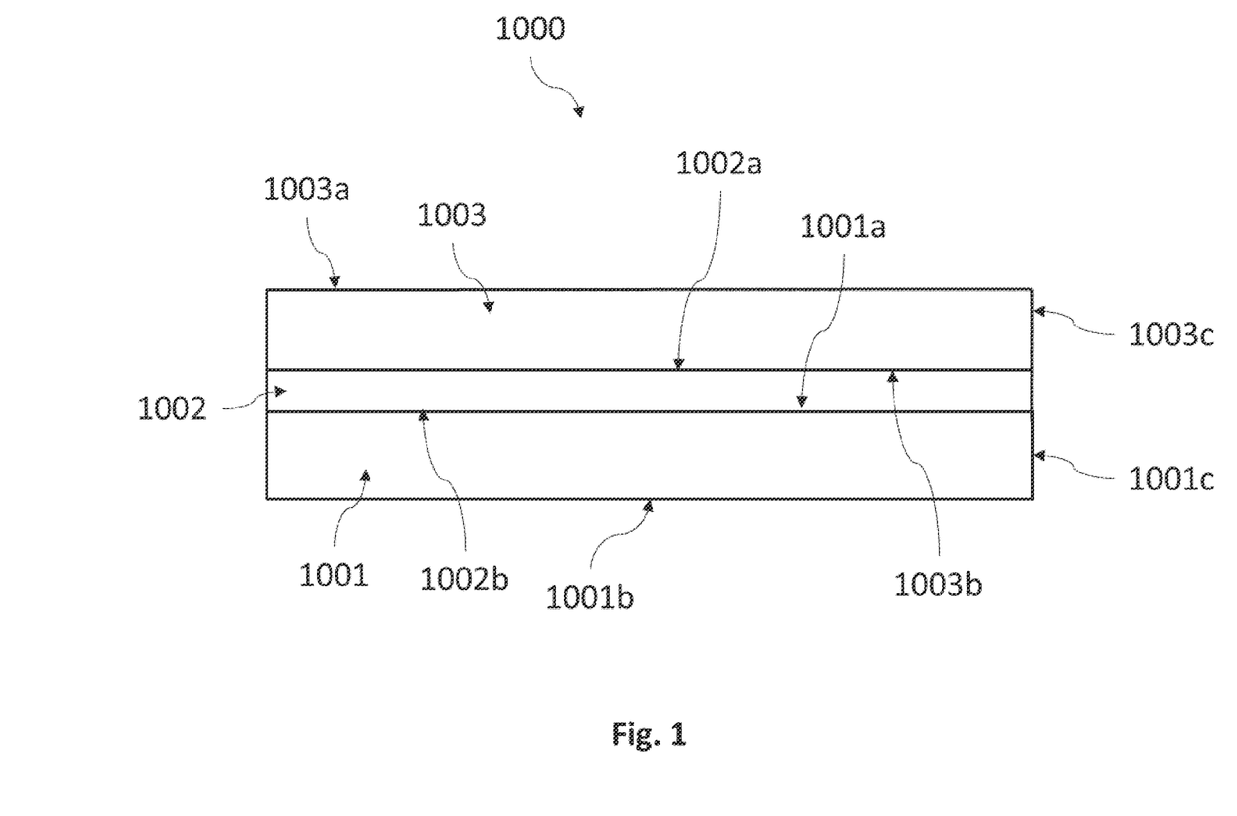
FIG. 1 is a schematic representation of a composite laminate according to the invention.

The subject of the invention, illustrated by the drawing of FIG. 1, is a composite laminate 1000 comprising:
an organic polymeric support 1001 comprising an edge 1001c, a first main face 1001a and a second main face 1001b;
a dielectric layer 1002 comprising a first main face 1002a and a second main face 1002b;
a first transparent organic polymeric substrate 1003 comprising an edge 1003c, a first main face 1003a and a second main face 1003b;

wherein:
the first main face 1002a of the dielectric layer 1002 is in contact with the second main face 1003b of the first transparent polymeric organic substrate 1003;
the second main face 1002b of the dielectric layer 1002 is in contact with the first main face 1001a of the organic polymeric support 1001;
the dielectric layer 1002 has a refractive index greater than the refractive index of the first transparent organic polymeric substrate 1003;
the adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the first transparent organic polymeric substrate 1003.

The composite laminate according to the invention has the advantage of simplifying the manufacture of reflective transparent layered elements. In particular, the organic polymeric support 1001 is a sacrificial element whose function is to serve as support for deposition of the dielectric layer before transfer to the first transparent organic polymeric substrate 1003, in accordance with the method for manufacturing a layered element with diffuse reflection described hereinbelow. In other words, it is generally not intended to be retained in said layered element. Thus, this support 1001 can be shrewdly chosen so as to be compatible with the composition of the dielectric layer and/or the method of deposition thereof. It is not necessarily transparent.

The following nonlimiting method can be used to check that the adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the first transparent organic polymeric substrate 1003. It consists in separation of the composite laminate, for example by peeling it back manually, then measuring the ohmic resistances of the surface 1001a of the organic polymeric support 1001 and of the surface 1003b of the first transparent organic polymeric substrate 1003. Since the dielectric layer 1002 is generally more conductive than the support 1001 and the first substrate 1003, if the ohmic resistance of the surface 1003b of the first substrate 1003 is lower than that of the surface 1001a of the support, then the adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the first transparent organic polymeric substrate 1003.

Alternatively, it is possible to carry out an optical examination, by optical spectrum measurement in reflection, in transmission or in absorption, of the surface 1001a of the organic polymeric support 1001 and of the surface 1003b of the first transparent organic polymeric substrate 1003. If a spectral behavior characteristic of the dielectric layer 1002, for example a greater reflection in the infrared, is mostly observed on the surface 1003b of the first substrate 1003, then the adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the first transparent organic polymeric substrate 1003.

The adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the first transparent organic polymeric substrate 1003. That makes it possible to transfer, by separation, the dielectric layer 1002 from the organic polymeric support 1001 to the first transparent organic polymeric substrate 1003 when the composite laminate 1000 according to the invention is used to manufacture a transparent layered element with diffuse reflection such as that described hereinbelow.

This difference in the adhesive energies can notably be obtained by selecting an organic polymeric support 1001 in which the physico-chemical properties of its first main face 1001a intrinsically confer upon it, by its composition and/or its surface morphology, an adhesive energy lower than that between the first main face 1002a of the dielectric layer 1002 and the second main face 1003b of the first transparent organic polymeric substrate 1003.

In one embodiment of the composite laminate of the invention, the second main face 1003b of the first transparent organic polymeric substrate 1003 and/or the first main face 1001a of the organic polymeric support 1001 can be textured and/or chemically functionalized to obtain a lower adhesive energy.

An example of functionalization can be a layer of silicone a few nanometers to a few tens of micrometers thick.

The second main face 1003b of the first transparent organic polymeric substrate 1003 can be a textured surface. The function of this textured surface can be to contribute to the diffuse reflection of a transparent layered element with diffuse reflection that can be obtained by a manufacturing method such as that described hereinbelow. This textured surface can be intrinsic to the substrate or obtained by texturing methods such as embossing, etching or chemical attack. Preferably, the first organic polymeric substrate 1003 can be selected such that it has an intrinsic surface texturing.

As an example, the texturing of the faces 1003b and/or 1001a can be in the form of a surface roughness characterized by a parameter Rz measured according to the standard ISO 4287:1997 and whose value is between 1 μm and 1 mm, in particular between 5 μm and 100 μm, preferably between 25 μm and 100 μm, even between 25 μm and 50 μm, or even between 30 μm and 45 μm.

As an example, the organic polymeric support substrate can be based on polyethylene terephthalate (PET), polyethylene naphthalate (PEN), ethylene tetrafluoroethylene (ETFE) or poly(methyl methacrylate) (PMMA).

Advantageously, the absolute value of the difference between the refractive index at 550 nm of the dielectric layer 1002 and the refractive index at 550 nm of the first transparent organic polymeric substrate 1003 is at least 0.3, even at least 0.5, preferably at least 0.8.

When manufacturing a transparent layered element with diffuse reflection by a manufacturing method such as that described hereinbelow, this feature favors the reflection of the electromagnetic radiation by the textured surface 1003b.

The dielectric layer 1002 can be based on metal oxides or metal nitrides, on their own or in mixtures. These oxides or nitrides can be stoichiometric or non-stoichiometric. The dielectric layer 1002 can notably be based on the following compounds $Si_3N_4$, $SnO_2$, $ZnO$, $AlN$, $NbO$, $NbN$, $TiO_2$, $TiO_x$ on their own or in mixtures.

The dielectric layer can be a thin layer, that is to say a layer whose thickness is less than a micrometer, a few hundreds of micrometers, even a few tens of micrometers.

The organic polymeric support 1001 is preferably a film, typically with a thickness of between 5 and 200 μm.

The first transparent organic polymeric substrate 1003 can be a film whose dimensions and composition are suited to a use as component of a transparent layered element with diffuse reflection, such as that which can be obtained using a manufacturing method described hereinbelow.

In particular, the first transparent organic polymeric substrate 1003 can advantageously be based on poly(vinyl butyral). It is often involved as lamination interlayer component in a transparent layered element with diffuse reflection for transparent laminated glazing and generally has an intrinsic surface texture allowing it to contribute to the diffuse reflection function of said layered element.

In a particular embodiment of the invention, the composite laminate comprises:
- an organic polymeric support 1001 based on PET comprising an edge 1001c, a first main face 1001a and a second main face 1001b;
- a dielectric layer 1002 based on titanium oxide, with a thickness of between 10 nm and 100 nm, preferably between 30 and 70 nm, and comprising a first main face 1002a and a second main face 1002b;
- a first transparent organic polymeric substrate 1003 based on PVB comprising an edge 1003c, a first main face 1003a and a second main face 1003b, textured or not.

Figure 2:
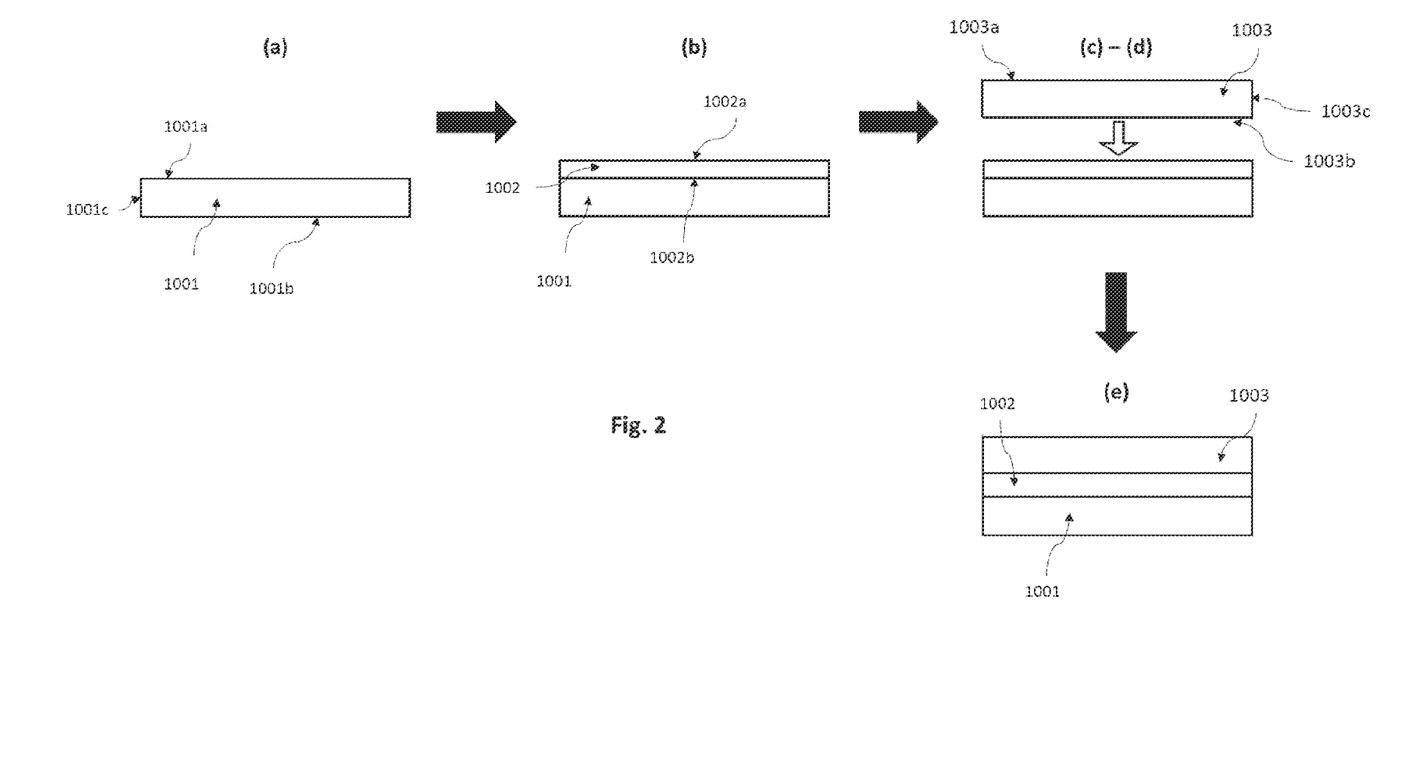
FIG. 2 is a schematic representation of a method for manufacturing a composite laminate according to the invention.

The invention relates also to a method for manufacturing a composite laminate according to the invention. It is illustrated by the drawing of FIG. 2.

The method for manufacturing a composite laminate 1000 comprises the following steps:
(a) depositing a dielectric layer 1002 on the first main face 1001a of an organic polymeric support 1001;
(b) bringing the dielectric layer 1002 into contact with the second main face 1003b of a first transparent organic polymeric substrate 1003;
(c) rolling the assembly formed by the organic polymeric support 1001, the dielectric layer 1002 and the first organic polymeric substrate 1003.

In said method:
said dielectric layer 1002 has a refractive index greater than the refractive index of said first transparent organic polymeric substrate 1003;
the adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the transparent organic polymeric substrate 1003.

The step (a) of depositing the dielectric layer can be performed using several physical or chemical deposition methods. Examples are cathodic sputtering assisted by a magnetic field, chemical vapor phase deposition, dip-coating, spin-coating.

According to one embodiment of the method, the step (a) of depositing the dielectric layer is performed using cathodic sputtering methods. These methods can possibly be assisted by a magnetic field. The advantage of these methods is that they allow the deposition of thin dielectric layers, can be used with numerous types of organic polymeric supports, such as PET, PEN, PMMA or even ETFE.

The thickness of the thin dielectric layer deposited can be less than a micrometer, a few tens of micrometers, even a few hundreds of micrometers.

The method can also comprise, before the step (a), a step of texturing and/or chemical functionalization of the first main face 1001a of the organic polymeric support 1001 and/or, before the step (b), a step of texturing and/or of chemical functionalization of the second main face 1003b of the first transparent organic polymeric substrate 1003. These additional steps can be advantageous to adjust the adhesive energy between the second main face 1002b of the dielectric layer 1002 and the first main face 1001a of the organic polymeric support 1001 so that it is much lower than that between the first main face 1002a of the dielectric layer 1002 and the second main face 1003b of the transparent organic polymeric substrate 1003. That can be useful when there is a risk of the two adhesive energies being similar, notably because of the choice in the composition of the support 1001 and of the first transparent substrate 1003.

An example of functionalization step for a support 1001 based on PET can be the deposition of a layer of silicone of a few tens of micrometers. An example of texturing step for a support 1001 based on PMMA can be an embossing of microreliefs whose dimensions and geometrical arrangement.

The invention relates also to a composite laminate that can be obtained using any embodiment of the method for manufacturing a composite laminate described above.

One advantage of the composite laminate according to the invention is that it can be manufactured upstream and stored, before being used subsequently in a method for manufacturing a transparent layered element with diffuse reflection.

Thus, a manufacturer of transparent layered elements with reflection can build up a range of composite laminates with different combinations of dielectric layers and of transparent polymeric organic substrates. The composite laminate which is most appropriate for the application sought can then be selected.

Advantageously, the organic polymeric support 1001 and the first organic polymeric substrate 1003 can then be flexible films. That makes it possible to store the composite laminate according to the invention in roll form ready to be employed prior to its use in a method for manufacturing a transparent layered element with diffuse reflection according to a method such as that described hereinbelow.

The advantages of the composite laminate with respect to their use are illustrated by the method for manufacturing a transparent layered element with diffuse reflection which is described hereinbelow.

Figure 3:
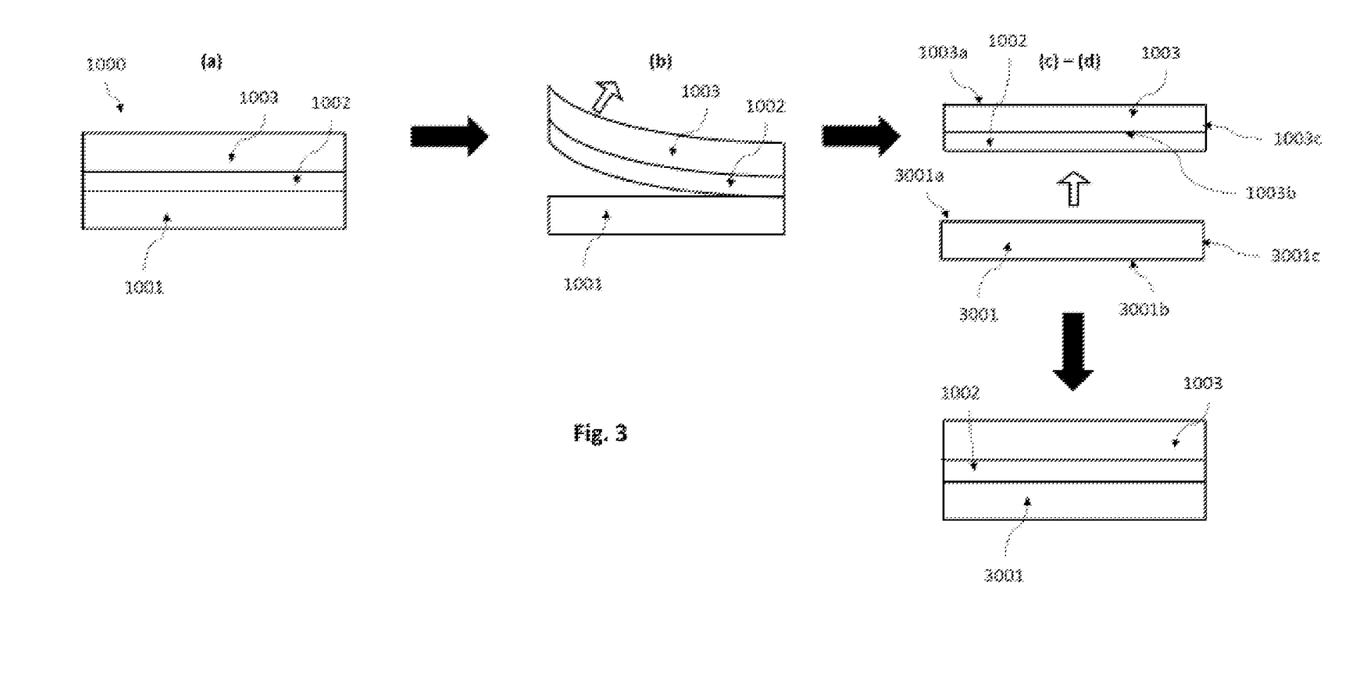
FIG. 3 is a schematic representation of a method for manufacturing a transparent layered element with diffuse reflection from a composite laminate according to the invention.

Said method comprises the following steps:
(a) supplying a composite laminate 1000 according to any one of the embodiments described previously;
(b) delaminating said composite laminate 1000 so as to provoke the removal of the organic polymeric support 1001;
(c) supplying a second transparent organic polymeric substrate 3001 comprising an edge 3001c, a first main face 3001a and a second main face 3001b;
(d) bringing the first face 3001a of the second transparent organic polymeric substrate 3001 into contact with the second main face 1003b of the first transparent polymeric substrate 1003 so as to insert the dielectric layer 1002 between said faces 3001a, 1003b.

One noteworthy advantage of the composite laminate according to the invention, when it is notably used in such a method for manufacturing a transparent layered element with diffuse reflection, is that it makes it possible to overcome the technical constraints of the existing methods without affecting the optical performances of said duly obtained element. That is notably due to the sacrificial nature of the organic polymeric support 1001 and to the possible transfer of the dielectric layer 1002 from said support 1001 to the first substrate 1003.

Thus, to manufacture a transparent layered element with diffuse reflection, it is now no longer necessary to use an organic polymeric support 1001 that is compatible both with the deposition of the dielectric layer 1002 and with the specific use of the transparent layered element with diffuse reflection. That was, for example, generally the case with the laminated glazings comprising a lamination interlayer formed by the transparent layered element with diffuse reflection.

The invention therefore makes it possible to increase the choice of transparent substrate/dielectric layer combinations. It also makes it possible to avoid designing manufacturing methods dedicated to certain transparent layered elements with diffuse reflection, or even significantly modifying existing methods when a change of transparent substrate or of dielectric layer is sought in said layered elements.

The invention is, also, particularly suited to the manufacture of transparent layered elements with diffuse reflection operating in the visible spectral range of electromagnetic radiation, that is to say between 380 and 800 nm.

It should be noted that the adhesive energies can vary with the temperature at which the composite laminate is used to manufacture a transparent layered element with diffuse reflection. These variations depend notably on the nature and the surface properties of the materials used for the support 1001 and the first substrate 1003. Also, the separation step (b) is preferably performed within a temperature range and/or a separation speed range in which the adhesive energy between the second main face 1002b of the dielectric layer 1002 and the first main face 1001a of the organic polymeric support 1001 is less than the adhesive energy between the first main face 1002a of the dielectric layer 1002 and the second main face 1003b of the first transparent organic polymeric substrate 1003.

According to an embodiment of the abovementioned method, the first main face 3001a of the second transparent organic polymeric substrate 3001 is a textured surface, for example in the form of a surface roughness. This feature can participate in increasing the level of diffuse reflection of the transparent layered element.

The invention relates also to a transparent layered element with diffuse reflection that can be obtained by a method as described previously.

One advantage of the layered element thus obtained is that it can be used directly as lamination interlayer. In this sense, the invention relates also to a laminated glazing comprising a lamination interlayer formed by a transparent layered element with diffuse reflection that can be obtained by a method as described previously.

Another advantage is that it can also be incorporated directly in a transparent projection screen or, indirectly, as lamination interlayer of a laminated glazing used as component of said projection screen.

In one embodiment of the invention, particularly suited to the manufacture of a transparent lamination interlayer with diffuse reflection for laminated glazing, the composite laminate 1001 comprises:
an organic polymeric support 1001 based on PET comprising an edge 1001c, a first main face 1001a and a second main face 1001b;
a dielectric layer 1002 based on titanium oxide, with a thickness of between 10 nm and 100 nm, preferably between 30 and 70 nm, and comprising a first main face 1002a and a second main face 1002b;
a first transparent organic polymeric substrate 1003 based on PVB comprising an edge 1003c, a first main face 1003a and a second main face 1003b textured in the form of a surface roughness whose parameter Rz according to the standard ISO 4287:1997 is between 25 µm and 50 µm.

The method for manufacturing a transparent lamination interlayer with diffuse reflection for laminated glazing can then comprise the following steps:

(a) supplying a composite laminate 1000 such as that just described previously;

(b) delaminating said composite laminate 1000 so as to provoke the removal of the organic polymeric support 1001, the dielectric layer 1002 adhering mostly continuously or discontinuously to the textured second main face 1003b of the first transparent organic polymeric substrate 1003;

(c) supplying a second transparent organic polymeric substrate 3001 based on PVB comprising an edge 3001c, a first main face 3001a and a second main face 3001b;

(d) bringing the first face 3001a of the second transparent organic polymeric substrate 3001 into contact with the textured second main face 1003b of the first transparent polymeric substrate 1003 so as to insert the dielectric layer 1002 between said faces 3001a, 1003b.

The features and advantages of the invention are illustrated by the exemplary embodiments of the invention described hereinbelow.

Four composites laminates 1000 according to the invention have been manufactured according to the manufacturing method previously described. They are described in table 1.

In CL.1, the organic polymeric support 1001 is a functionalized PET film 25 µm thick. It is coated with a layer of silicone. This support is marketed by Mitsubishi Polyester Film under the name Hostaphan® 7SLK. In CL.2 and CL.3, the support 1001 is a smooth ETFE film 75 µm thick. In CL.4, the support 1001 is a textured PMMA film.

The dielectric layer 1002 is identical for all four composite laminates CL. 1 to CL.4. It is a layer based on stoichiometric or non-stoichiometric titanium oxide (TiOx) 60 nm thick.

It has been deposited by cathodic sputtering assisted by a magnetic field (magnetron) on the organic polymeric support 1001. When the organic polymeric support 1001 comprises a textured and/or functionalized surface, the dielectric layer 1002 has been deposited on this surface.

In CL.1, CL.2 and CL.4, the first transparent organic polymeric substrate 1003 is a PVB-1 film 0.38 mm thick and having a texturing in the form of a surface roughness of between 5 and 25 µm in terms of Rz measured according to the standard ISO 4287:1997. In CL.3, the first transparent organic polymeric substrate 1003 is a PVB-2 film 0.38 mm thick with a surface roughness of between 24 and 48 µm.

The step of rolling the assembly formed by the organic polymeric support 1001, the dielectric layer 1002 and the first organic polymeric substrate 1003 has been formed using rollers at 60° C. with a linear pressure force less than 10 N/cm.

TABLE 1

|  | CL. 1 | CL. 2 | CL. 3 | CL. 4 |
| --- | --- | --- | --- | --- |
| Substrate 1 | PVB-1 | PVB-1 | PVB-2 | PVB-1 |
| Dielectric layer | TiOx | TiOx | TiOx | TiOx |
| Support | PET | ETFE | ETFE | PMMA |

Four transparent layered elements have been manufactured from the four composite laminates of table 1. They are described in table 2. After the step of delamination of the composites laminated according to the manufacturing method of the invention, a second transparent organic polymeric substrate 3001 based on PVB-1 has been brought into contact with the dielectric layer 1002.

TABLE 2

|  | EC. 1 | EC. 2 | EC. 3 | EC. 4 |
| --- | --- | --- | --- | --- |
|  | Composite laminate used | | | |
|  | CL. 1 | CL. 2 | CL. 3 | CL. 4 |
|  | Structure obtained | | | |
| Substrate 1 | PVB-1 | PVB-1 | PVB-2 | PVB-1 |
| Dielectric layer | TiOx | TiOx | TiOx | TiOx |
| Substrate 2 | PVB-1 | PVB-1 | PVB-1 | PVB-1 |

Each of the four transparent layered elements with diffuse reflection have been incorporated in a laminated glazing in the form of a lamination interlayer between two sheets of transparent soda-lime-silica mineral glass.

For comparison purposes, three reference examples corresponding to transparent layered elements with diffuse reflection according to the state of the art have also been manufactured. They are described in table 3.

They comprise an organic polymeric support. For R.1, it is a functionalized PET film 25 µm thick. It is coated with a layer of silicone. This support is marketed by Mitsubishi Polyester Film under the name Hostaphan® 7SLK. In R.2, the support 1001 is a smooth ETFE film 75 µm thick. In R.3, the support 1001 is a textured PMMA film.

A dielectric layer, identical for all three elements R.1 to R.3, is a layer based on stoichiometric or non-stoichiometric titanium oxide (TiOx) 60 nm thick. It has been deposited by cathodic sputtering assisted by a magnetic field (magnetron) on the organic polymeric support.

For each element R.1 to R.3, the assembly formed by the dielectric layer and the support has been encapsulated between two PVB-1 films 0.38 mm thick having a texturing in the form of a surface roughness of between 5 and 25 µm in terms of Rz measured according to the standard ISO 4287:1997.

Each of the three transparent layered elements with diffuse reflection R.1 to R.3 has been incorporated in a laminated glazing in the form of a lamination interlayer between two sheets of transparent soda-lime-silica mineral glass.

TABLE 3

|  | R. 1 | R. 2 | R. 3 |
| --- | --- | --- | --- |
| Substrate 1 | PVB-1 | PVB-1 | PVB-1 |
| Dielectric layer | TiOx | TiOx | TiOx |
| Support layer | PET | ETFE | PMMA |
| Substrate 3 | PVB-1 | PVB-1 | PVB-1 |

The optical properties of the glazings comprising the elements EC. 1 to EC. 4 and R.1 to R.3 have been measured. They are grouped together in table 4.

In table 4:

the light transmission in the visible spectrum, TL, and the reflection, RL, in the visible spectrum are defined, measured and calculated in accordance with the standards EN 410 and ISO 9050. The color is measured in the IEC 1976 L*a*b* chromatic space according to the standard ISO 11664 with an illuminant D65 and a visual field of 2° for the reference observer.

a*T and b*T are the values of the parameters a* and b* measured in transmission in the IEC 1976 L*a*b* chromatic space with an illuminant D65, a visual field of 2° for the reference observer;

a*R and b*R are respectively the values of the parameters a* and b* measured in reflection in the IEC 1976 L*a*b* chromatic space with an illuminant D65 and a visual field of 2° for the reference observer;

H is the level of "fuzziness" or of "haze" corresponding to the proportion of the electromagnetic radiation transmitted through a material, and whose dispersion angle is greater than 2.5° relative to the direction of incidence of said radiation. This definition corresponds to those of the standards ISO 14782 and ASTM D1003. It has been measured using a BYK-Gardner Haze-Gard haze-meter;

C is the level of transparency or of clarity of a layer. It is defined as a ratio between, on the one hand, the difference between the intensity of the radiation transmitted through said layer in a given direction in a first solid angle defined by a first cone of revolution whose axis of revolution is said direction and in which the half-angle at the vertex is less than 0.7, the vertex of said first cone being placed on the surface of said layer by which the electromagnetic radiation is transmitted, and the intensity of the radiation transmitted in a second solid angle defined by a second cone of revolution in which the axis of revolution is said direction and in which the half-angle at the vertex is between 0.7 and 2°, the vertex of said second cone coinciding with the vertex of the first cone and, on the other hand, the total intensity of the electromagnetic radiation transmitted in all of the solid angle defined by the cone of revolution in which the axis of revolution is said direction and in which the half-angle at the vertex is between 0° and 2°. The level of transparency has been measured using a BYK-Gardner Haze-Gard haze-meter.

DL is the proportion, in percentage terms, of the "diffuse light", that is to say the proportion of light reflected by the surface of a material, whose angular dispersion is greater than 2.5° relative to the direction of the incident light.

TABLE 4

|  | VR. 1 | VR. 2 | VR. 3 | VEC. 1 | VEC. 2 | VEC. 3 | VEC. 4 |
|---|---|---|---|---|---|---|---|
| H(%) | 0.7 | 7 | 0.7 | 1.5 | 0.7 | 0.8 | 0.9 |
| C(%) | 99.2 | 99.2 | 99.6 | 99.1 | 98.4 | 99.5 | 99.4 |
| TL (%) | 69.7 | 70.4 | 71.8 | 72 | 77.6 | 74.2 | 73 |
| a* | 0.7 | 0.8 | 0.6 | 0.6 | −0.1 | 0.5 | 0.3 |
| b*T | 0.3 | 2.5 | 1.5 | 0.9 | 0 | 1.3 | 0.6 |
| RL (%) | 27.7 | 23.4 | 22.8 | 22.5 | 19.3 | 22.9 | 21.6 |
| a*R | −3.4 | −2.3 | −2.1 | −2.3 | −1.5 | −2.5 | −2 |
| b*R | 1.1 | 0.3 | 0.6 | 0.8 | 2.5 | 0.1 | 1 |
| DL (%) | 1.8 | 16.1 | 14.2 | 14.1 | 11.4 | 14.9 | 14.1 |
| DL/RL (%) | 6 | 69 | 62 | 63 | 59 | 65 | 65 |

The results for the laminated glazing VR. 1 show that the use of PET directly in the glazing does not make it possible to obtain a transparent laminated glazing with diffuse reflection. The DL value is too low.

The results for the laminated glazing VR.2 show that the use of ETFE directly in the glazing provokes an excessively high level of fuzziness that is likely to hamper visibility through the glazing.

The laminated glazing VR.3 exhibits adequate optical properties in terms of levels of transparency and of diffuse reflection. In particular, the DL value is greater than 10%, the level of transparency, C, is greater than 98% and the level of fuzziness, H, is less than 1.

The laminated glazings VR.2 and VR.3 are laminated glazings commonly used for transparent projection screens. The proportion of diffuse light, DL, is greater than 10%, their level of transparence C is greater than 98% and their level of haze is less than 1.

The results of table 4 show that the optical properties of the laminated glazings VEC.1, VEC.2, VEC.3 and VEC.4 are similar to that of the laminated glazing of the reference laminated glazing VR.3.

These results clearly show that the invention makes it possible to obtain transparent layered elements with reflection for a given application by retaining the technical advantages of substrates suited to the deposition of dielectric layers but not particularly suitable for said application.

The invention advantageously makes it possible to benefit from the technical advantages of any substrate suited to the deposition of dielectric layers whatever the application sought for the transparent layered element with diffuse reflection that can be obtained. By virtue of the invention, it is also now possible to overcome the technical constraints of the existing methods for manufacturing transparent layered elements with diffuse reflection, without affecting the optical performances sought for the layered element thus obtained.

The invention claimed is:

1. A composite laminate comprising:
    an organic polymeric support comprising an edge, a first main face and a second main face;
    a dielectric layer comprising a first main face and a second main face;
    a first transparent organic polymeric substrate comprising an edge, a first main face and a second main face;
    wherein:
    the first main face of the dielectric layer is in contact with the second main face of the first transparent polymeric organic substrate;
    the second main face of the dielectric layer is in contact with the first main face of the organic polymeric support;
    the dielectric layer has a refractive index greater than the refractive index of the first transparent organic polymeric substrate;
    an adhesive energy between the second main face of the dielectric layer and the first main face of the organic polymeric support is less than an adhesive energy between the first main face of the dielectric layer and the second main face of the first transparent organic polymeric substrate to make it possible to transfer, by separation, the dielectric layer from the organic polymeric support to the first transparent organic polymeric substrate, and the second main face of the first transparent organic polymeric substrate is textured with a surface roughness between 1 μm and 1 mm and/or chemically functionalized with a layer of silicone, and/or the first main face of the organic polymeric support is textured with a surface roughness between 1 μm and 1 mm.

2. The composite laminate as claimed in claim 1, wherein the second main face of the first transparent organic polymeric substrate is textured with a surface roughness between 1 μm and 1 mm.

3. The composite laminate as claimed in claim 1, wherein the organic polymeric support is based on polyethylene terephthalate, polyethylene naphthalate, ethylene tetrafluoroethylene or poly(methyl methacrylate).

4. The composite laminate as claimed in claim 1, wherein the first transparent organic polymeric substrate is based on poly(vinyl butyral).

5. The composite laminate as claimed in claim 1, wherein an absolute value of a difference between the refractive index at 550 nm of the dielectric layer and the refractive index at 550 nm of the first transparent substrate is at least 0.3.

6. The composite laminate as claimed in claim 1, wherein the dielectric layer is based on metal oxides or metal nitrides.

7. A method for manufacturing a composite laminate comprising:
   (a) depositing a dielectric layer on a first main face of an organic polymeric support;
   (b) bringing the dielectric layer into contact with a second main face of a first transparent organic polymeric substrate;
   (c) laminating the assembly formed by the organic polymeric support, the dielectric layer and the first transparent organic polymeric substrate;
   and in which method:
   the first main face of the dielectric layer is in contact with the second main face of the first transparent polymeric organic substrate;
   a second main face of the dielectric layer is in contact with a first main face of the organic polymeric support;
   said dielectric layer has a refractive index greater than the refractive index of said first transparent organic polymeric substrate;
   an adhesive energy between the second main face of the dielectric layer and the first main face of the organic polymeric support is less than an adhesive energy between the first main face of the dielectric layer and the second main face of the first transparent organic polymer substrate to make it possible to transfer, by separation, the dielectric layer from the organic polymeric support to the first transparent organic polymeric substrate, and
   the second main face of the first transparent organic polymeric substrate is textured with a surface roughness between 1 µm and 1 mm and/or chemically functionalized with a layer of silicone, and/or the first main face of the organic polymeric support is textured with a surface roughness between 1 µm and 1 mm.

8. The method as claimed in claim 7 further comprising, before step (a), texturing and/or of chemically functionalizing the first main face of the organic polymeric support and/or, before step (b), texturing and/or chemically functionalizing the second main face of the first transparent organic polymeric substrate.

9. The method as claimed in claim 7, wherein step (a) of depositing the dielectric layer is performed using cathodic sputtering methods.

10. A method for manufacturing a transparent layered element with diffuse reflection, said method comprising:
    (a) supplying a composite laminate as claimed in claim 1;
    (b) delaminating said composite laminate so as to provoke removal of the organic polymeric support;
    (c) supplying a second transparent organic polymeric substrate comprising an edge, a first main face and a second main face;
    (d) bringing the first main face of the second transparent organic polymeric substrate into contact with the second main face of the first transparent polymeric substrate so as to insert the dielectric layer between said first main face of the second transparent organic polymeric substrate and the second main face of the first transparent polymeric substrate.

11. The method as claimed in claim 10, wherein the first main face of the second transparent organic polymeric substrate is a textured surface.

12. The composite laminate as claimed in claim 5, wherein the absolute value of the difference between the refractive index at 550 nm of the dielectric layer and the refractive index at 550 nm of the first transparent substrate is at least 0.5.

13. The composite laminate as claimed in claim 12, wherein the absolute value of the difference between the refractive index at 550 nm of the dielectric layer and the refractive index at 550 nm of the first transparent substrate is at least 0.8.

* * * * *